W. M. WHEILDON.
MEANS FOR DELIVERING MATERIAL FROM ROLLS.
APPLICATION FILED APR. 6, 1918.
1,361,945. Patented Dec. 14, 1920.
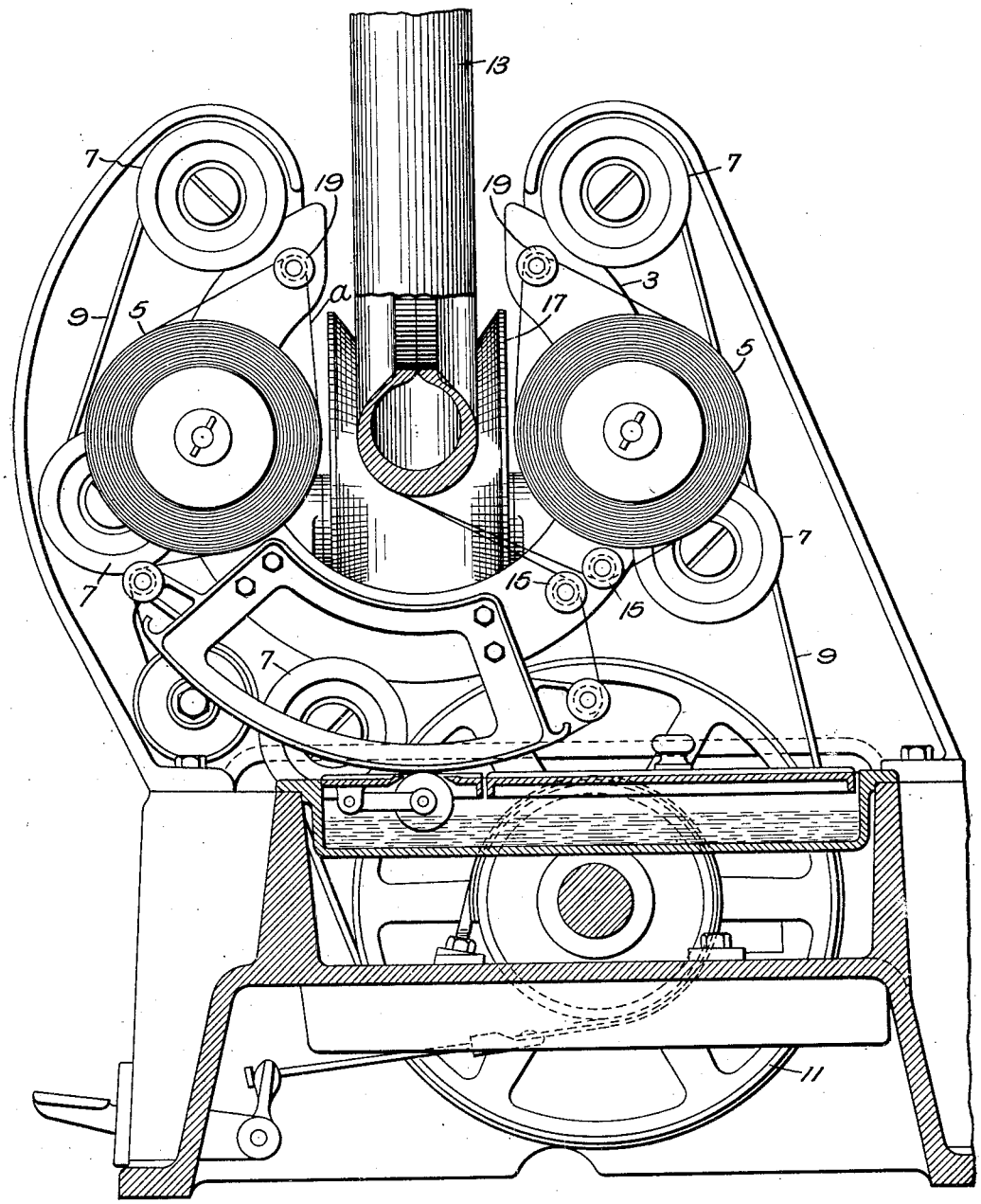
Inventor:
William M. Wheildon

UNITED STATES PATENT OFFICE.

WILLIAM M. WHEILDON, OF ASHLAND, MASSACHUSETTS, ASSIGNOR TO EDWARD H. ANGIER, OF FRAMINGHAM, MASSACHUSETTS.

MEANS FOR DELIVERING MATERIAL FROM ROLLS.

1,361,945.  Specification of Letters Patent.  Patented Dec. 14, 1920.

Application filed April 6, 1918. Serial No. 227,099.

*To all whom it may concern:*

Be it known that I, WILLIAM M. WHEILDON, a citizen of the United States, and resident of Ashland, in the county of Middlesex and State of Massachusetts, have invented an Improvement in Means for Delivering Material from Rolls, of which the following description, in connection with the accompanying drawings, is a specification, like characters on the drawings representing like parts.

This invention relates to the feeding or delivery of material from rolls upon which it is wound and in particular to the feeding of material which is carried on a revolving head or shuttle which rotates about an article to be wrapped so that the material is drawn from the roll and wrapped about the article. I have here chosen for illustration as a specific embodiment of my invention a machine for wrapping vehicle tires.

My invention will be best understood by reference to the following description of such an embodiment taken in connection with the accompanying drawing wherein I have shown as much of a tire wrapping machine as is necessary to an understanding thereof.

Referring to the drawing, the machine shown is of a type not novel to this application and embodies in its construction an annular shuttle 3 on which are mounted one or more rolls of wrapping material such as paper strip, two rolls 5 being here shown. The shuttle 3 may be supported on rollers 7 and rotated in any desired manner, as by means of the belt 9 and driving wheel 11. The wrapping strips are led from the supply rolls 5, in a manner hereinafter to be more fully described, and to the tire 13 over suitable delivery rollers 15. The tire 13 may be supported on rollers 17 and by the rotation of the shuttle the strip is drawn from the supply rolls 5 and wrapped about the tire. It will be understood that the rollers 17 may be driven in any desired manner to revolve the tire 13 and that thus the wrapping is applied as a helix about the tire. Machines operating on this principle were well known prior to my invention and I describe this one solely by way of an example.

My invention is applicable to any machine utilizing a supply of material packaged in the form of a roll, such as the rolls 5, and is not limited to a wrapping machine or to a tire wrapping machine. In feeding material from rolls, as for example in machines of the type shown, difficulty has been encountered in providing a proper unwinding tension on the strip without placing undue strain on the same. For example, when the roll is large the inertia thereof in rotating is such that it tends to move faster than the material is drawn therefrom and causes buckling of the material and the outer turns lift under centrifugal force. All these tendencies are exaggerated in a machine of the type shown wherein the roll moves bodily as well. In tire wrapping machines, for example, a spring washer has been used bearing upon the side of the roll to serve as a brake to retard the unwinding thereof. However, if this is set up sufficiently hard to properly control the roll when it is large, the resistance to unwinding is so great, when most of the material has been unreeled and when the diameter of the roll is small and consequently when the pull of the strip works with small mechanical advantage, that the strip is apt to break. My present invention provides means for maintaining a proper control of the speed of unwinding so as to prevent the breaking of the material and at the same time to prevent too rapid motion of the roll.

I effect this in the present example by utilizing the material itself and in the example shown it is made to serve alternatively the functions of a driving belt and of a band brake. Taking, for example, the left hand supply roll 5. The material is delivered from the roll 5 to the right to the tire, but instead of leading it directly to the right from the roll I form a loop thereof over a relatively small guide roller 19 on the opposite side. It leads from the main roll over the roller 19 and then back, providing a run of material engaging the side of the supply roll 5, preferably over an extended arc. The appearance, as seen in the drawing, is that of a belt trained over a large pulley represented by the supply roll and over a small pulley represented by the roller 19.

In the course of operation of the machine as the strip is drawn on to the tire, the run of the strip designated by the letter *a* engages the side of the roll in the same manner as a driving belt and turns the same at the same linear speed as that at which the strip is being drawn to the tire, and this is true no matter what the diameter of the roll and its consequent angular speed. If, however, the roll tends to turn too fast the strip engaging the outer periphery thereof, viewing the figure, acts as does a band brake and checks this movement at its inception.

It has been found by actual use on a machine of the type shown that the rolls of paper can be drawn off to their very ends, whereas using the same paper in the same machine but training the strip directly from the supply roll over the delivery rollers 15, either trouble was experienced through too rapid rotation of the supply roll when large or the strip was broken after a major part of the roll had been unwound.

Having explained in detail the application of my invention to a tire wrapping machine as one illustration of its use, the principles exemplified thereby and which I consider new and desire to secure by Letters Patent I shall express in the following claim:—

A machine having a rotating head or shuttle to revolve a strip supply about an article to be wrapped, means supporting a roll of strip thereon to turn substantially in the plane of revolution and a guide for the strip adjacent the support, the strip being trained from the roll over the guide and back in engagement with the opposite side of the roll to bear frictionally thereagainst and move in the same sense under draft.

In testimony whereof, I have signed my name to this specification,

WILLIAM M. WHEILDON.